N. B. MILLER.
PACKING.
APPLICATION FILED NOV. 12, 1908.
917,637.
Patented Apr. 6, 1909.
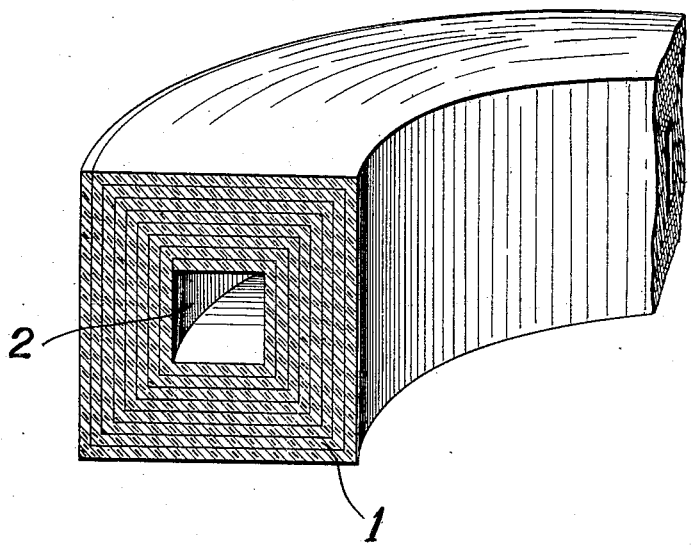
WITNESSES:
INVENTOR
Norman Bruce Miller,
BY
ATTORNEY.

UNITED STATES PATENT OFFICE.

NORMAN BRUCE MILLER, OF PHILADELPHIA, PENNSYLVANIA, ASSIGNOR TO CLEMENT RESTEIN COMPANY, OF PHILADELPHIA, PENNSYLVANIA, A CORPORATION OF PENNSYLVANIA.

PACKING.

No. 917,637.          Specification of Letters Patent.          Patented April 6, 1909.

Application filed November 12, 1908. Serial No. 462,214.

*To all whom it may concern:*

Be it known that I, NORMAN BRUCE MILLER, a citizen of the United States, and resident of Philadelphia, in the county of Philadelphia and State of Pennsylvania, have invented certain new and useful Improvements in Packing, of which the following is a specification.

The object of the present invention is to provide a packing for piston rings which will not jam in the cylinder either by reason of its swelling or by reason of its being drawn up or compressed by the action of the adjustment of parts of the piston.

To this and other ends hereinafter set forth the invention stated in general terms comprises the improvements to be presently described and finally claimed.

The nature, characteristic features and scope of the invention will be more fully understood from the following description taken in connection with the accompanying drawing forming part hereof and in which is illustrated a perspective view of a piece of packing embodying features of the invention.

In the drawings the packing 1, is square in cross section and it is provided with a hollow core or central opening 2 which is also square in cross-section and extends throughout the length of the packing. The substantially rectangular form of the opening 2 is an essential of the invention.

In use the packing is placed as a ring in a groove upon the surface of the piston so that the packing may not expand laterally and if it should swell it will not project unduly beyond the curved face of the piston in which position it would bend upon the internal wall of the cylinder, because the substantially rectangular shape of the opening 2 permits it to expand inward, thus as it were reducing the size of the opening 2. In other words, the shape of the opening 2 is such that the packing can readily expand inward and in consequence of this it does not bulge outward where it would bind on the cylinder. To illustrate this it may be said that if the opening 2 were substantially circular it would constitute an arch and the least line of resistance would be for the packing to bulge outward under the effect of lateral pressure, but since the opening 2 is rectangular the least line of resistance is for the packing to bulge inward. Furthermore when the sides of the packing are compressed by reason of the drawing up of the abutting parts of the piston the packing bulges inward in the manner described so that it does not jam upon the inner surface of the cylinder. The fact that the packing bulges inward instead of becoming concaved on its outside working face produces another important feature, in that the corners of the packing adjacent to the cylinder surfaces remain sharp and these corners are an important factor in effecting a tight joint.

The packing may be composed of layers of fabric and rubber or cement and it can be made by rolling the fabric upon a square or rectangular rod in which case its exterior would be cylindrical. However, while the rod is in position the packing can be compressed into generally rectangular form whereupon the rod can be withdrawn.

It will be obvious to those skilled in the art to which the invention relates that modifications may be made in details without departing from the spirit thereof, hence the invention is not limited further than the prior state of the art may require, but

Having thus described the nature and objects of my invention what I claim as new and desire to secure by Letters Patent is—

1. A packing rectangular in cross-section and having an unobstructed open space or cavity extending lengthwise of the packing throughout the length thereof, substantially as described.

2. A packing rectangular in cross-section and having a hollow core also rectangular in cross-section arranged axially of the packing and extending throughout the length thereof, substantially as described.

3. A packing consisting of layers of fabric cemented together and being of rectangular external form and having a hollow unobstructed core of generally rectangular cross section extending axially throughout the packing and in the direction of its length, substantially as described.

In testimony whereof I have hereunto signed my name.

NORMAN BRUCE MILLER.

In the presence of—
     FRANK E. FRENCH,
     A. B. SLOUGHTON.